July 26, 1966 G. COWPER ETAL 3,263,080
RADIATION DOSIMETER FOR MEASURING EXPOSURE TO
HIGH AND LOW ENERGY RADIATION
Filed Aug. 9, 1963 3 Sheets-Sheet 1

PATTERN OF PERFORATIONS

INVENTORS
George Cowper
Stuart D. Simpson

By Schlesinger, Schlesinger & Arkwright
Attorneys

United States Patent Office 3,263,080
Patented July 26, 1966

3,263,080
RADIATION DOSIMETER FOR MEASURING EXPOSURE TO HIGH AND LOW ENERGY RADIATION
George Cowper and Stuart Douglas Simpson, Deep River, Ontario, Canada, assignors to Atomic Energy of Canada Limited, Ottawa, Ontario, Canada, a corporation
Filed Aug. 9, 1963, Ser. No. 301,009
5 Claims. (Cl. 250—83)

This invention relates to the measurement of ionizing radiation doses and has particular reference to a personal film dosimeter.

It is well known to provide dosimeters containing a photographic emulsion which is protected from light and which is filtered by materials of differing absorption for the particles and radiation of interest. Thus, a dosimeter may contain a film which is responsive to $\beta$ particles, thermal-neutrons, X and $\gamma$ rays, placed in an opaque thin wrapping. Part of the film will then be screened by a piece of plastic with a hole in it (the $\beta$ particles passing through the hole but not to the same extent through the plastic). A further portion of the film will be covered by a thin layer of aluminium (X radiation and $\gamma$ radiation passing through the aluminium but $\beta$ particles not passing through). Yet another section of film will have a covering of tin and adjacent it a section piece covered by cadmium. The tin will not stop thermal neutrons, whereas the cadmium is highly absorbent of thermal neutrons. In stopping the neutrons, the cadmium emits secondary gamma radiation which causes exposure of the film underneath and not on the film underneath the tin. This difference in film densities is an indication of thermal neutron exposure. Finally, part of the film will be covered with a lead filter which, although not stopping X and $\gamma$ radiation entirely, serves to flatten out the peak response of such films in the region of 100 kev.

It is an object of the invention to improve the response of radiation sensitive films covered by a filter.

Reference will now be made to the accompanying drawings in which.

Figure 1:
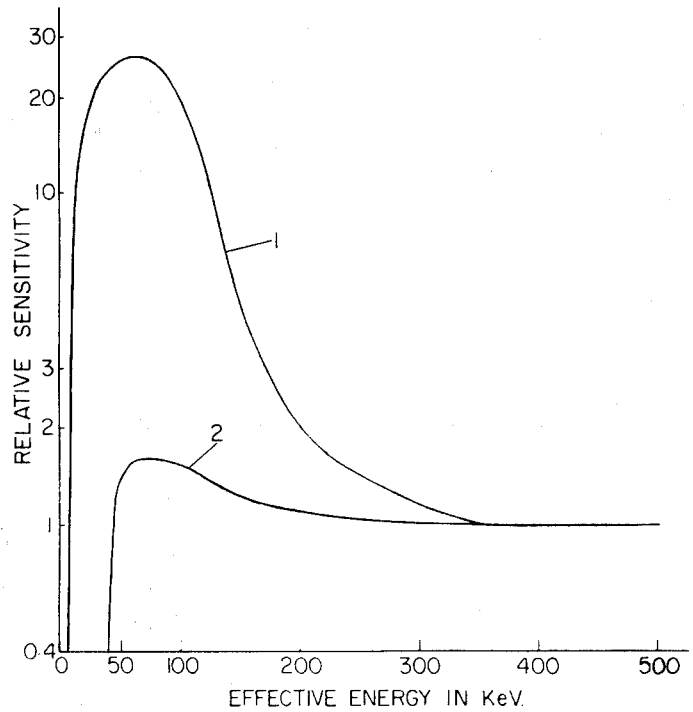
FIGURE 1 shows two curves; the first of a typical film's response to $\gamma$ radiation; the second of the response of the same film corrected by a filter of .625 mm. of lead.

Referring now to FIGURE 1 of the drawings, curve 1 shows the response of a typical film such as a Du Pont 555 emulsion over the range 0 to 500 kev. in which sensitivity along the ordinate axis is defined as ratio of radium gamma ray exposure to the exposure at a given energy in roentgens necessary to produce the same film density after development of the film.

Curve 2 shows the modification of response obtained by .76 mm. of lead placed over the film. It can be seen that while the peak at about 75 kev. has been reduced tenfold, the response at 40 kev. has completely disappeared. This region of $\gamma$ radiation at energies less than 50 kev. can sometimes be neglected, but it is quite possible in certain installations such as nuclear reactors and isotope handling for the personnel concerned to come into contact with radiation from a multitude of different sources when intense radiation at predominantly low energies may be encountered. Sensitivity in the low range is then important.

In carrying out the teaching of the present invention, it has been found that the difficulties of the prior art can be overcome by modification of the lead sheet 5 placed over a conventional film.

More specifically, according to the invention, there is provided in a dosimeter comprising a radiation sensitive film and including a filter plate over said film for absorbing radiation falling thereon, and wherein the filter substantially masks said film at lower radiation energies, the improvement which comprises, piercing said filter in a predetermined hole pattern to increase the sensitivity of said film in areas beneath said holes, and viewing said film through a densitometer having an aperture of view so shaped with respect to said grid pattern to include, on the average, a predetermined ratio of area of film exposed through said holes to area of said film exposed through said plate.

Figure 3:
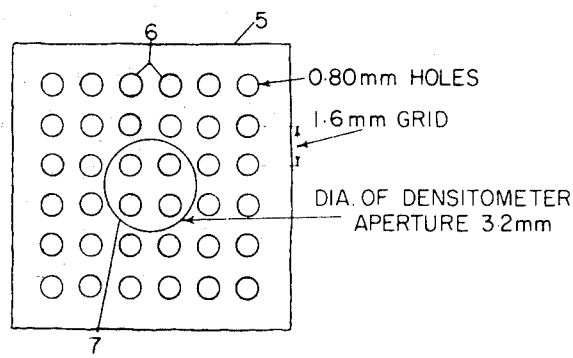
FIGURE 3 shows a plan view of a perforated filter with superimposed outline of field of view of a densitometer.

If this sheet is perforated in the manner shown in FIGURE 3 at 6, then portions of the film will be exposed directly through the perforations without the impediment of lead and the remaining portions will be screened. Provided therefore that the lead filter does not move with respect to the film during the exposure, the parts opposite the perforations will be more heavily exposed than those directly screened by the lead. The response which the film then presents upon development is shown by the curve 3 of FIGURE 2.

The ratio of film area exposed through holes to the area covered by filter determines the shape of the energy dependence characteristic. An increase in this ratio for a fixed filter thickness will enhance the response to radiation at low energies while a reduction in the ratio will diminish low energy response. Ideally, an energy independent response is desired and this objective is approached by an optimum choice of ratio. Unfortunately, the optimum is not perfect but is the best result obtainable.

Figure 4:
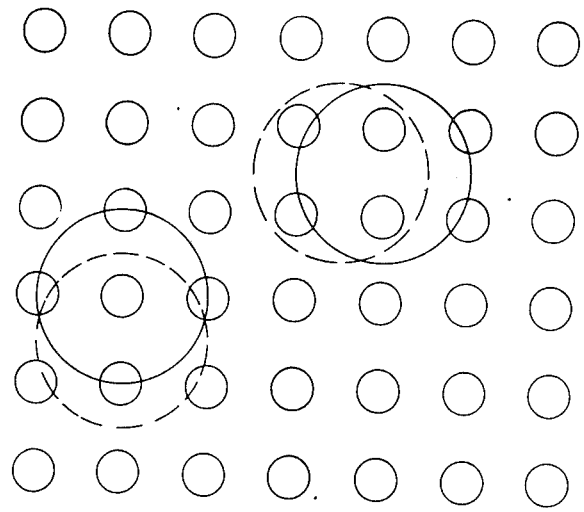
FIGURES 4 and 5 illustrate different relationships between perforation size and densitometer diameter.
Figure 5:
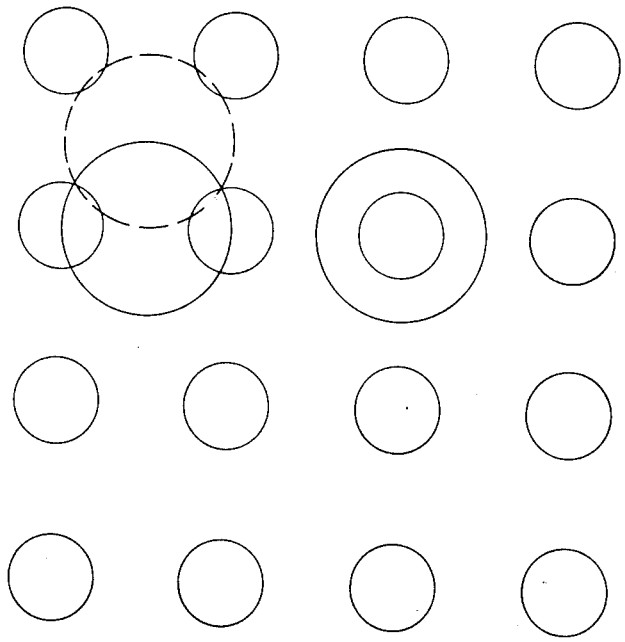

For a fixed ratio of open to exposed area, the relationship between grid pattern size and densitometer aperture size affects the dependence of the measured density upon the relative alignment of the grid pattern over the densitometer aperture. This effect is illustrated in FIGURES 4 and 5. In FIGURE 4, the layout corresponds to 0.75 mm. holes in a 1.5 mm. grid examined through a 3 mm. diameter aperture. When the aperture is shifted by a distance of half a grid width it is evident from comparison of the shaded areas that approximately the same ratio of unshielded to shielded film is seen. Thus, the density measured does not depend critically upon exact alignment of the dosimeter film.

However, in FIGURE 5 where the hole diameter and grid spacings have been doubled, a corresponding shift of the aperture produces two quite different pictures. Now the densitometer response will vary with lateral displacement of the film since the fraction of "hole area" contained in the aperture can vary over an order of magnitude. The information in FIGURES 4 and 5 has been extracted in Table I. The effect of plate thickness is to modify the response to the dosimeter when radiation is incident at various angles to the surface. All film dosimeters whether using solid or perforated filters are sensitive in this regard and ideally one would like to have an infinitely thin absorber. Tests have shown that the perforated filter dosimeter is no better and no worse than the solid filter type in the matter of variation of response with angle of incidence.

It is indeed true that a densitometer may be made with any size of aperture that can be uniformly illuminated. However, there is a practical advantage in having one with a fairly small diameter. It is not unusual to find that the density distribution across a film dosimeter may show variations. Sometimes these will be due to edge effects (i.e. radiation incident parallel to the plane of the film) and sometimes a spot of radioactive contamination on a film dosimeter package will cause intense local blackening. Edge effects are minimized with a large area filter. Occasionally, a steady variation in density from one side of a film to the other will be caused by the film having been exposed obliquely at a very short distance from a point source of radiation. A fairly large fraction of film area is turned over to gamma detection primarily because gamma exposure is most frequently encountered and because of the artifacts noted above it is essential to be able to recognize when spurious behavior is encountered. This can be done when a small diameter densitometer aperture is used to sample the density at various points.

Table I

| Case | Position of centre densitometer aperture | Number of "hole areas" enclosed in aperture (estimated) | Total Fraction hole area/ aperture area |
|---|---|---|---|
| Small grid pattern | At centre of hole | 2.85 | .18 |
|  | Midway between hole centers | 2.72 | .17 |
|  | Midway between hole centers along diagonal. | 4 | .25 |
| Large grid pattern | At centre of hole | 1 | .25 |
|  | Midway between hole centers | .9 | .225 |
|  | Midway between hole centers along a diagonal. | .1 | .025 |

Figure 2:
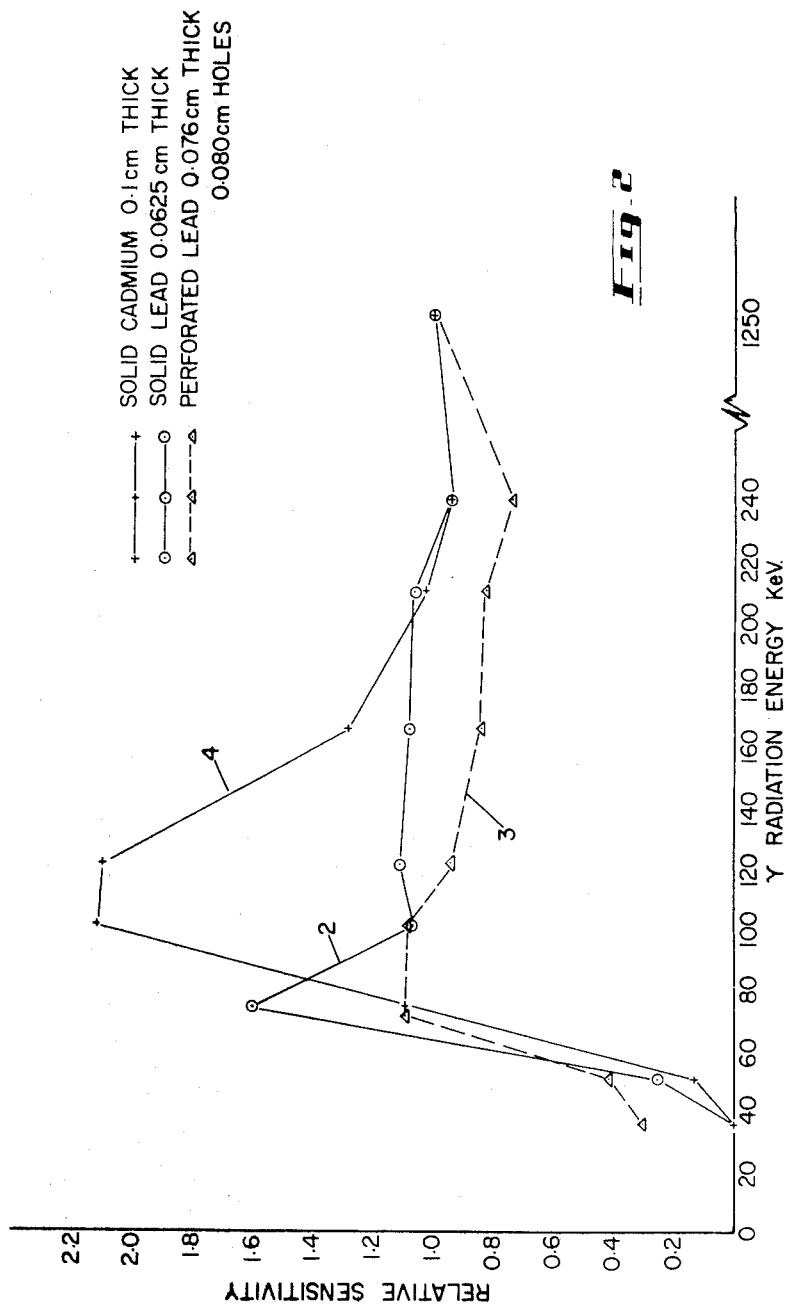
FIGURE 2 shows the response of a film with a lead filter in more detail than FIGURE 1, the response of the film and filter combination when modified in accordance with the teaching of the invention and the response with a solid cadmium filter.

It should be borne in mind that although the curve 3 of FIGURE 2 represents the overall response of the film beneath the grid pattern, the densitometer which is used to measure the transmission of light through the developed film is of small diameter. Therefore, if the field of view of the densitometer 7 happens to observe a greater area ratio of film beneath apertures to film screened by lead at one observation, than it does at a subsequent one, a different density reading will be obtained in the two cases. Theoretically, it should be adequate to create a grid of a very fine pattern so that the densitometer would always look at a portion of film which contains statistically a large number of holes, but if this is done, impartial screening of the film directly beneath portions of lead occurs due to obliquely travelling γ rays which pass through only a portion of the thickness of lead adjacent the holes rather than the full thickness. On the other hand, if the grid is too coarse, then the densitometer will not see an adequate number of holes and the density reading is too dependent upon the position of the aperture on the film. Curve 4 has been included in FIGURE 2 for comparison purposes.

As a practical matter, a film directly covered by a sheet of lead 5 of .76 mm. thickness in which the lead is placed tightly up against the paper wrapping of the film and having a rectangular grid pattern of circular holes or perforations 6 of .80 mm. in diameter with 1.6 mm. spacing between the centres of adjacent holes gives good results. The diameter of field of view 7 of the densitometer is 3.2 mm. With this pattern shape and size whose relationship is shown in FIGURE 3 wherever the densitometer aperture may be placed, the variation in the ratio of area of hole to filter exposed film is small and there is always the equivalent of area of approximately four holes within the field of view of the densitometer.

We claim:
1. A radiation dosimeter for measuring exposure to both high and low energy radiation which comprises, a radiation sensitive film, a filter plate over said film for absorbing radiation falling thereon, said filter substantially masking said film at lower radiation energies while permitting exposure at higher radiation energies, said filter plate defining a predetermined regularly repeated pattern of holes therethrough for increasing exposure of said film by said lower energy radiation in areas beneath said holes, the frequency of repetition of said hole pattern over each portion of said plate being chosen with respect to a viewing densitometer aperture for viewing the film after exposure, whereby said aperture encompasses a substantially uniform ratio of area of film exposed through said holes to area of film exposed through said plate regardless of the portion of said film viewed by said densitometer.

2. A dosimeter as defined in claim 1, said filter plate being pierced in a pattern of holes, each hole being substantially circular, of identical diameter and separated from its adjacent hole by a distance of about twice said diameter between centres of said holes.

3. A dosimeter as defined in claim 2 wherein said densitometer aperture is circular and of diameter between 2 and 2.5 times the separation of said centres.

4. A dosimeter as defined in claim 3 wherein said pattern is a rectangular grid.

5. A dosimeter as claimed in claim 4 wherein said filter is formed of lead about 0.76 mm. thick, said holes are about 0.80 mm. in diameter, spaced about 1.6 mm. between centres of adjacent holes, and said densitometer aperture is about 3.2 mm.

References Cited by the Examiner

UNITED STATES PATENTS

| 2,483,991 | 10/1949 | Wollan | 250—83 |
| 2,496,218 | 1/1950 | Kieffer | 250—83 |
| 2,770,719 | 11/1956 | Simjian | 250—59 |

RALPH G. NILSON, *Primary Examiner.*

JAMES W. LAWRENCE, *Examiner.*